United States Patent Office 3,296,029
Patented Jan. 3, 1967

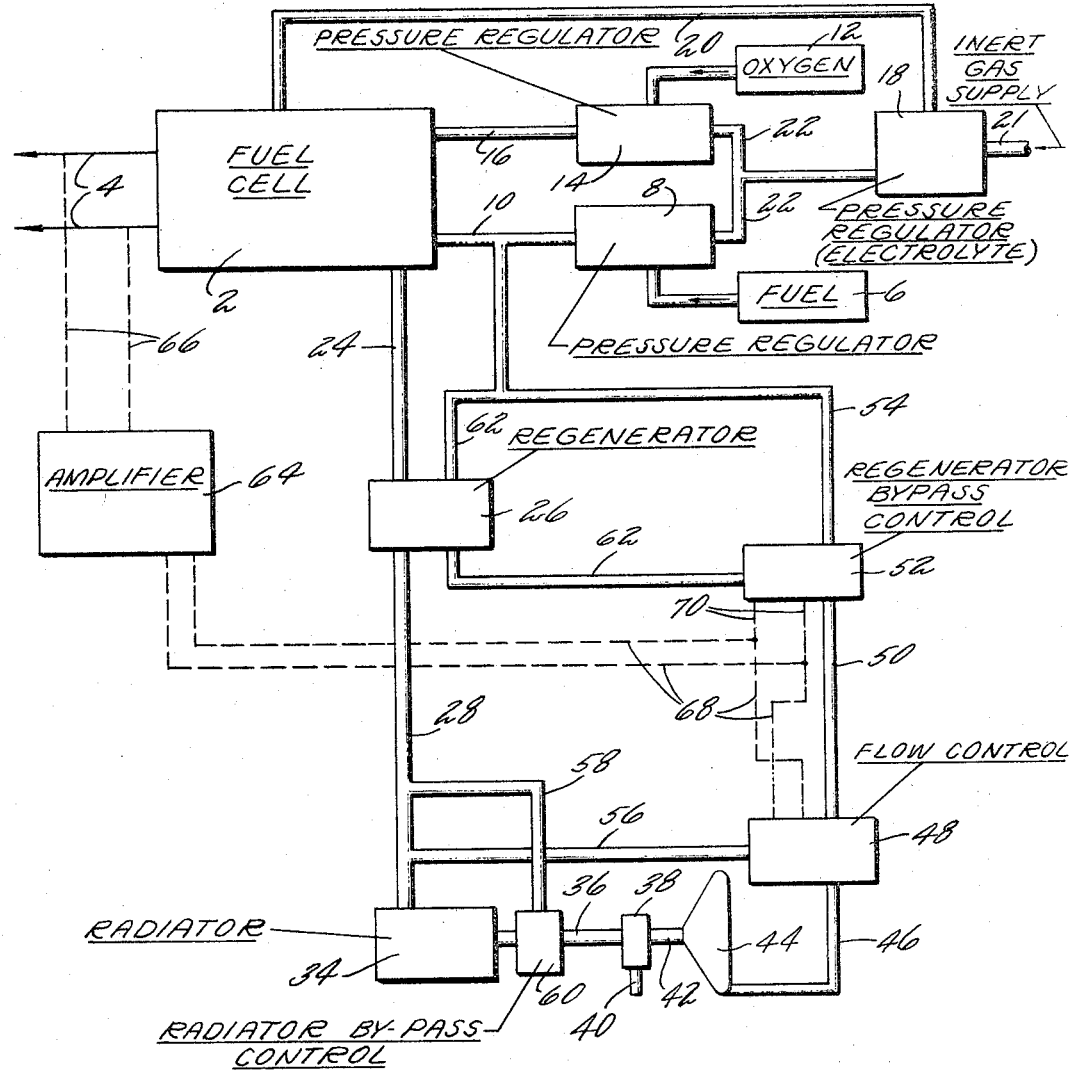

3,296,029
FUEL CELL SYSTEM FOR THE AUTOMATIC
CONTROL OF CELL TEMPERATURE
George H. Davis, Windsor Locks, Conn., assignor to
United Aircraft Corporation, East Hartford, Conn., a
corporation of Delaware
Filed Nov. 30, 1961, Ser. No. 155,949
7 Claims. (Cl. 136—86)

This invention relates to a fuel cell system in which the cell temperature is controlled as a function of cell output to maintain desired cell operation. This invention is in some respects an improvement on the copending application of Kunz, Serial No. 155,957, filed November 30, 1961, now Patent No. 3,198,664.

One feature of the invention is the control of the temperature of the cooling fluid as a function of the electrical output of the cell. Another feature is the use of an excess of fuel as a cooling fluid and controlling the quantity and/or temperature of the returned fluid as a function of cell output.

Another feature is the maintenance of the desired cell output by adjusting the operating temperature of the cell, since the cell output is a function of temperature. Another feature is the adjustment of the flow and temperature of the cooling fluid in order to maintain desired cell output.

As the cell ages the output at a selected temperature may decrease. One feature of the invention is the adjustment of cell temperature as a function of the actual cell output with respect to the desired cell output in order to maintain the desired cell output independently of cell aging.

Other features and advantages will be apparent from the specification and claims, and from the accompanying drawing which illustrates an embodiment of the invention.

The single figure is a diagrammatic view of the system.

As shown in the drawing, the fuel cell 2 has output leads 4 from which electrical power is derived from the cell. A fuel, which in the particular arrangement is hydrogen, is supplied from a source 6 through a pressure regulator 8 and a supply duct 10 to the fuel cell. Similarly, the oxidant is supplied under pressure from a source 12 through a pressure regulator 14 and a supply duct 16 to the fuel cell.

The pressure within the fuel cell, which would be the pressure of the electrolyte, is controlled by a pressure regulator 18 which is connected with the cell by a conduit 20. This pressure regulator operates to supply inert gas from a supply pipe 21 under a controlling pressure to regulators 8 and 14 through conduits 22. The arrangement is such as to assure a supply of fuel and oxidant through the supply ducts 10 and 16 at a pressure slightly higher than the electrolyte pressure. In this way the flow of the fuel and oxidant into the cell is assured and the proper interaction of fuel, oxidant and electrolyte will occur in the electrodes.

More fuel is circulated through the cell than will be utilized within the fuel cell and the excess of circulated fuel carries therewith as it leaves the cell some of the exhaust products of the fuel cell. In this particular cell the excess product is water vapor which discharges with the excess fuel through an exhaust conduit 24. This excess fuel and water vapor passes through a heat exchanger 26 and thence through a conduit 28 to a radiator 34. From the radiator which serves to condense the water vapor, the exhaust products are delivered through a conduit 36 to a water separator 38. In the separator the water is removed from the excess fuel and discharged through a conduit 40. From the water separator the excess fuel passes through a conduit 42 to a pump 44 and through a conduit 46 to a flow control valve 48. From valve 48 the excess fuel goes through a conduit 50 to another control valve 52 and thence through a duct 54 to the supply conduit 10. From the flow control valve 48 there is a bypass conduit 56 communicating with the duct 28 upstream of the radiator so that some of the excess fuel may be diverted by the control valve 48 into the conduit 56 and thence back into the radiator.

From the conduit 28 there is also a bypass duct 58 which permits a radiator bypass valve 60 to bypass part of or all of the exhaust products around the radiator 34 under certain conditions as for example, in reducing the heat removal by radiator 34 such that the temperature of the excess fuel in duct 46 may be higher.

The valve 52 is arranged to divert part of the excess fuel from the duct 54 and direct it instead to a conduit 62 which passes the excess fuel through the heat exchanger 26 and thence back to the conduit 54 downstream of the valve 52.

In operation, the fuel cell normally operates with the exhaust products mixed with the excess fuel passing through the heat exchanger 26 to be cooled and thence through the radiator 34 where, by further cooling, the water vapor is condensed to a liquid. As the pump removes the products from the radiator, the water is removed by the separator 38 and the excess fuel passes through the valves 48 and 52 and through the return conduit 54 to the cell through the fuel supply conduit 10.

The flow through the system is controlled as a function of the normal or desired electrical output for the cell. To accomplish this the output is measured by an output sensor and amplifier 64 which is connected by leads 66 to the output leads 4. This amplifier and control compares the actual fuel cell output to the theoretical or desired electrical output and if an error exists provides an adjustment of the valves 48 and 52. The effect of the adjustment of the valve 48 is to control the quantity of excess fuel returned to the fuel cell thereby controlling the rate of removal of the water vapor from within the fuel cell. Adjustment of the valve 52 controls the quantity of excess fuel flowing through the heat exchanger 26 for controlling the temperature of the excess fuel entering the supply duct 10 and thereby effectively controlling the temperature of the fuel cell. It will be understood that the excess fuel is used both for cooling the fuel cell, and, as above stated, for removing the water vapor accumulating in the cell as the cell operates. For example, assuming that the fuel cell is producing more than the desired electrical output thereby indicating that the cell is operating at higher than the established temperature, the control 64 will sense this higher output and will adjust the valve 52 to pass less of the excess fuel through the heat exchanger so that the excess fuel enters the supply pipe 10 at a lower temperature and will provide more cooling of the cell. If the lower temperature of the excess fuel does not reduce the temperature sufficiently to restore the cell to the desired output, the valve 48 will also be adjusted to decrease the quantity of excess fuel returned to the radiator through the conduit 56 thereby increasing the amount of fuel returned to the supply pipe 10 and providing for additional fuel cell cooling. Valves 48 and 52 are connected to the control 64 by leads 68 and 70, respectively.

Similarly, in adjusting for a cell temperature below that necessary to produce the desired output, the valve 52 passes additional fuel through the regenerator or heat exchanger 26 thereby increasing the temperature of the excess fuel returned to the cell so that less cooling is effected.

The function of the valve 60 is to permit control of the effectiveness of the radiator 34 thereby determining the cooling effect of the radiator on the excess fuel. The system by which the pressure of the oxidant and fuel is adjusted with respect to the electrolyte is well known and is not a part of the present invention. It is described to show that there is a pressure regulation by which to assure effective operation of the cell.

It is to be understood that the invention is not limited to the specific embodiment herein illustrated and described, but may be used in other ways without departure from its spirit as defined by the following claims.

I claim:

1. In a fuel cell control device, a fuel cell, means for supplying oxidant and an excess of fuel under pressure to said cell, a discharge conduit for removing the products of oxidation and the excess fuel from said cell, a regenerator connected to said conduit for receiving and for cooling said discharge products, a separator through which the cooled products are directed for removing the liquid products of oxidation from the excess fuel, a pump receiving the fuel from the separator for returning the excess fuel through the regenerator to the cell, a bypass for the excess fuel around the regenerator and valve means for controlling the amount of excess fuel bypassing the regenerator, said valve means being movable in response to the electrical output of the cell thereby to reduce the flow through the regenerator if the electrical output is too high.

2. A device as in claim 1, including a radiator between the regenerator and the separator, a return bypass around said pump and radiator and flow control valve means for controlling the flow through said return bypass.

3. A device as in claim 2 in which the last valve means is also movable in response to the electrical output of the cell.

4. In a hydrogen-oxygen fuel cell control device, a fuel cell, means for supplying oxygen and an excess of hydrogen under pressure to said cell, a discharge conduit for the exhaust products of the cell including excess hydrogen and water vapor, a regenerator through which said exhaust products are directed, a separator for removing the water vapor from the excess hydrogen, a pump for returning the excess hydrogen through the regenerator to the hydrogen supply means, a bypass for the excess hydrogen around the regenerator and valve means for controlling the amount of hydrogen bypassing the regenerator, said valve means being movable in response to a variation of the electrical output of the cell.

5. A device as in claim 4 in which there is a radiator between the heat exchanger and the separator, a return bypass around said pump and radiator, and valve means for controlling the flow through said return bypass.

6. A device as in claim 5 in which said last valve means is movable in response to variation in the electrical output of the cell.

7. In a fuel cell control device, a fuel cell, means for supplying oxidant and an excess of fuel under pressure to said cell, a discharge conduit for removing the products of oxidation and the excess fuel from the cell, a regenerator connected to said conduit for receiving and cooling said discharge products, a radiator downstream of the regenerator for condensing the products of oxidation, a separator through which the cooled products are directed for removing the liquid products of oxidation from the excess fuel, a pump for increasing the pressure of the excess fuel to return it through the regenerator to the fuel supply means for the cell, a bypass for the excess fuel around the regenerator, valve means for adjusting the amount of excess fuel flowing through the bypass, means for measuring the electrical output of the cell, means for moving said valve means in response to said measuring means, a return bypass around said pump and radiator for recirculating a part of the excess hydrogen through said radiator, second valve means for controlling the flow through said return bypass, and means responsive to said measuring means for adjusting said second valve means.

References Cited by the Examiner

UNITED STATES PATENTS

| | | | |
|---|---|---|---|
| 2,925,455 | 2/1960 | Eidensohn et al. | 136—86 |
| 3,009,327 | 11/1961 | Weil | 136—86 |
| 3,012,087 | 12/1961 | Van Billiard | 136—160 |

ALLEN B. CURTIS, *Primary Examiner.*

JOHN R. SPECK, WINSTON A. DOUGLAS, H. FEELEY, *Assistant Examiners.*